United States Patent
Kersting et al.

(10) Patent No.: US 11,080,341 B2
(45) Date of Patent: Aug. 3, 2021

(54) SYSTEMS AND METHODS FOR GENERATING DOCUMENT VARIANTS

(71) Applicant: International Business Machines Corporation, Armonk, NY (US)

(72) Inventors: Nicholas S. Kersting, Briarcliff Manor, NY (US); Michael P. Perrone, Yorktown Heights, NY (US); Jerome L. Quinn, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 16/023,831

(22) Filed: Jun. 29, 2018

(65) Prior Publication Data
US 2020/0004828 A1 Jan. 2, 2020

(51) Int. Cl.
G06F 7/00 (2006.01)
G06F 16/93 (2019.01)
G06K 9/62 (2006.01)
G06F 16/335 (2019.01)

(52) U.S. Cl.
CPC ............ *G06F 16/93* (2019.01); *G06F 16/335* (2019.01); *G06K 9/6276* (2013.01)

(58) Field of Classification Search
CPC .... G06F 16/335; G06F 16/93; G06F 16/3322; G06K 9/6276
USPC .................................. 707/748, 749, 752, 736
See application file for complete search history.

(56) References Cited

U.S. PATENT DOCUMENTS

| | | | |
|---|---|---|---|
| 5,699,427 A | 12/1997 | Chow et al. | |
| 6,976,207 B1* | 12/2005 | Rujan | G06K 9/6269 715/234 |
| 7,970,773 B1 | 6/2011 | Thirumalai et al. | |
| 8,234,560 B1 | 7/2012 | Zhou | |
| 2004/0223645 A1 | 11/2004 | Cliff | |
| 2006/0004747 A1 | 1/2006 | Weare | |
| 2006/0155530 A1 | 7/2006 | Altevogt et al. | |
| 2006/0155751 A1* | 7/2006 | Geshwind | G06F 16/3322 |
| 2009/0180126 A1 | 7/2009 | Matulic | |
| 2019/0317999 A1* | 10/2019 | McNeillie | G06F 40/40 |

FOREIGN PATENT DOCUMENTS

WO 2014091257 A2 6/2014

OTHER PUBLICATIONS

Wired, "How IBM's Watson Will Make Your Meals Tastier," Jun. 30, 2014, 9 pages. Retrieved from the Internet: URL: https://www.wired.com/2014/06/how-ibms-watson-will-make-your-meals-tastier/ [retrieved on Jun. 8, 2018].
Morgan, IBM Creates First Movie Trailer by AI [HD] | 20th Century Fox, Aug. 31, 2016. Retrieved from the Internet: URL: https://www.youtube.com/watch?v=gJEzuYynaiw [retrieved on Jun. 8, 2018].

* cited by examiner

*Primary Examiner* — Md I Uddin
(74) *Attorney, Agent, or Firm* — Troutman Pepper Hamilton Sanders LLP

(57) ABSTRACT

The present application relates to systems for generating new variants from an existing corpus of documents and methods for using the same. The systems and methods generally comprise a corpus of documents and one or more types of variety provided by a user. The system generates one or more documents that are variants of the documents in the corpus of documents.

16 Claims, 5 Drawing Sheets ns, the determined variety of each document in the corpus is the inverse of indifference. In some embodiments, the determined variety of each document in the corpus is the weighted sum of the spectral moments.

In some embodiments, the document generation system comprises a user interface. In some embodiments, the step of transmitting the one or more new documents and the variety of each document to the user is via the user interface.

In some embodiments, the user can update the corpus of documents, the one or more types of variety, or both. In some embodiments, user updates can be applied to new documents in real-time.

SYSTEMS AND METHODS FOR GENERATING DOCUMENT VARIANTS

FIELD

The present application generally relates to systems for generating new variants from an existing corpus of documents and methods for using the same.

BACKGROUND

The concept of variety is important to a range of fields and industries. For example, fashion and music depend on a sustained flux of new product variations, writing professions are devoted to producing books and speeches on common themes re-expressed in new ways, and even technology-driven fields reward varied approaches to problem solving. While human ingenuity has long been at the forefront of creative variety, it is famously unpredictable and not scalable. Tools to assist human creativity through variety are typically limited to a specific area or field, e.g., a thesaurus. Thus, what is needed is a scalable tool that can generate variations on existing items or documents, or a group of items and documents, across one or more user defined areas.

SUMMARY

Embodiments herein provide a computer implemented method in a data processing system comprising a processor and a memory comprising instructions which are executed by the processor to cause the processor to implement a document generation system, the method comprising: receiving, by the document generation system, one or more documents selected by the user that defines a corpus; receiving, by the document generation system, one or more types of variety selected by the user; determining, by the document generation system, the variety of each document in the corpus by applying the one or more types of variety to the one or more documents in the corpus; generating, by the document generation system, one or more new documents, wherein the one or more new documents are variants of the one or more documents in the corpus; determining, by the document generation system, the variety of each new document by applying the one or more types of variety to the one or more new documents; and transmitting, by the document generation system, the one or more new documents and the variety of each document in the corpus and each new document generated by the system, to the user.

Embodiments herein also provide a system for generating new documents, comprising a memory comprising instructions which are executed by a processor configured to: receive one or more documents selected by the user that defines a corpus; receive one or more types of variety selected by the user; determine the variety of each document in the corpus by applying the one or more types of variety to the one or more documents in the corpus; generate one or more new documents, wherein the one or more new documents are variants of the one or more documents in the corpus; determine the variety of each new document by applying the one or more types of variety to the one or more new documents; and transmit the one or more new documents and the variety of each document in the corpus and each new document generated by the system, to the user.

In some embodiments, the determined variety of each document in the corpus is a differential variety. In some embodiments, the determined variety of each new document is a nearest-neighbor differential variety. In some embodi-

BRIEF DESCRIPTION OF THE DRAWINGS

The foregoing and other aspects of the present disclosure are best understood from the following detailed description when read in connection with the accompanying drawings. For the purpose of illustrating the disclosure, there is shown in the drawings embodiments that are presently preferred, it being understood, however, that the disclosure is not limited to the specific embodiments disclosed.

DETAILED DESCRIPTION OF THE EMBODIMENTS

Figure 1:
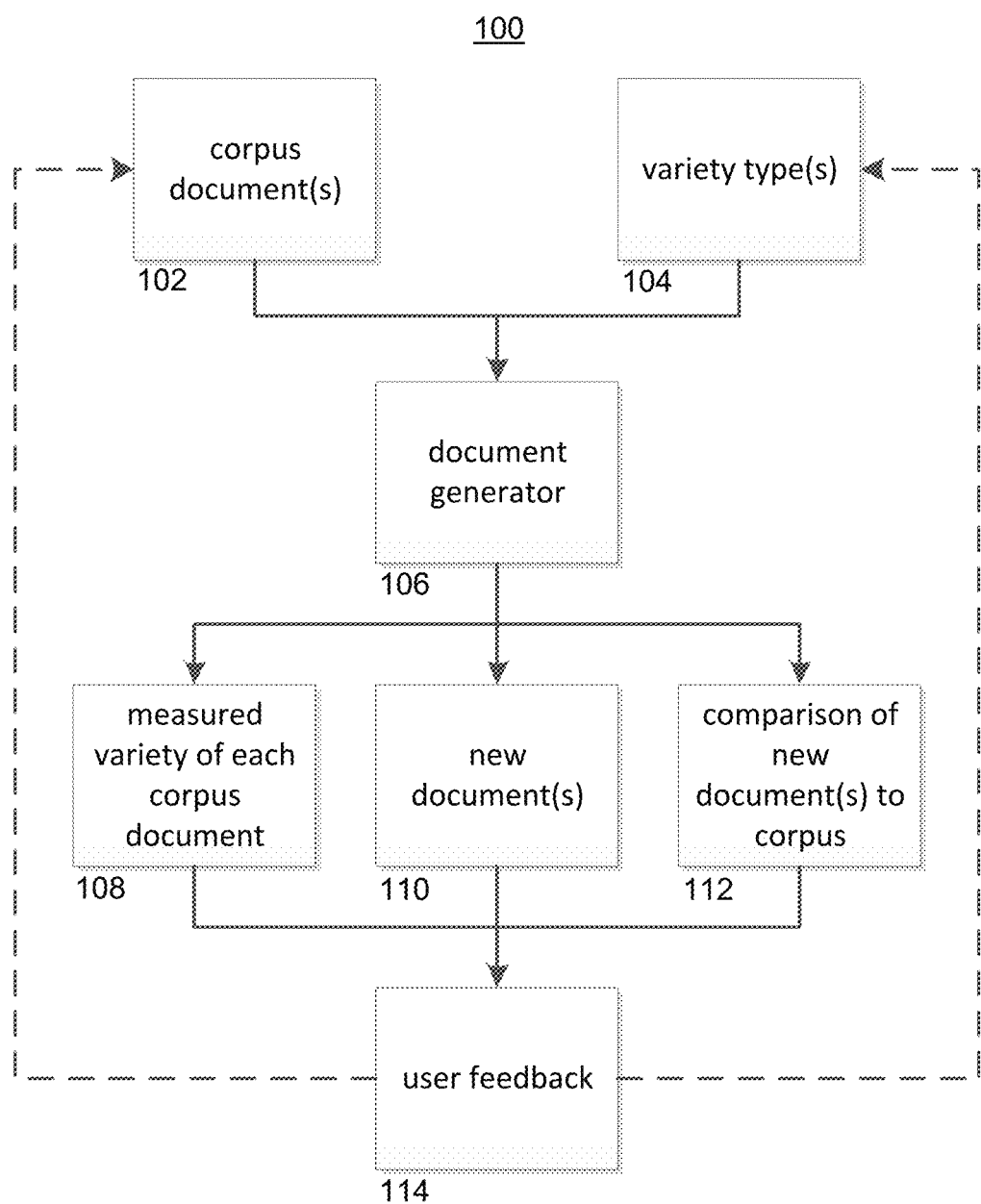
FIG. 1 depicts a block diagram of a system for generating new documents from a corpus of documents.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

As used herein, the term "document" or "documents" refers to any product which can be represented and edited on a computer. In some embodiments, a document comprises at least one sequence of amplitudes in at least one dimension. For example, a musical score could be a document with a sequence of 1-dimentional frequencies (e.g., musical notes), or a text document could be a multi-dimensional document with length, pronunciation, emotional tone, part-of-speech etc. In some embodiments, documents can be graphical in nature.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-along software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situation awareness that mimic human cognition based on experiences
- Answer questions based on natural language and specific evidence Embodiments herein relate to a system for generating one or more new documents based on a corpus of existing documents and one or more dimensions of variety. The system computes the variety of each of the documents in the corpus, as defined by the one or more dimensions of variety, and then generates one or more new documents that are variations of the corpus of existing documents. In some embodiments, the system computes additional information, e.g. was a selected document successful, how much did a selected document cost, and the like. In some embodiments, the additional information is generated before the system generates the one or more new documents. In some embodiments, the additional information is generated after they system generates the one or more new documents.

In some embodiments, the generation of a new document by the system proceeds by changing the units and amplitudes of each corpus document in a randomized fashion, or by combining components of different corpus documents until a new document with the requisite variety is produced. For example, some of the words or phrases of a text document can be replaced with synonyms or phrases of similar meaning while respecting grammatical rules, or notes of a musical score can be altered while respecting the rhythm and key.

FIG. 1 depicts a block diagram representation of components, outputs, and data flow of a system for generating new documents 100. To begin, the system 100 needs at least one document to define a corpus of documents 102. In some embodiments, there is no limit to the number of documents that can be added to the corpus. The system 100 also requires at least one type of variety 104. In some embodiments, the variety can be selected from any of the types of variety disclosed herein. In some embodiments, the variety can be selected by a user. In some embodiments, the variety can be a category or other dimension that is relevant to the corpus documents.

The document generator 106 takes in the corpus documents 102 and the variety types 104 as inputs. The document generator 106 analyzes the corpus documents 102 by the variety types 104 and produces one or more outputs: the measured variety of each corpus document 108, one or more new documents 110, and a comparison of the new documents to the corpus documents 112. In some embodiments, the document generator 106 produces only one output: the one or more new documents 110. The measured variety of each corpus document 108 is a comparison between the one or more documents in the corpus. In some embodiments, the measured variety of each corpus document can be compared to each other individual document in the corpus. In some embodiments, the measured variety of each corpus document can be compared to an average of the variety of the entire corpus. The new documents 110 are the new creations by the system, and can be, for example, any of the document types described herein and the like. The comparison of the new documents to the corpus 112 is a comparison between the one or more new documents 110 and the documents of the corpus 102. In some embodiments, the measured variety of each new document can be compared to each individual document in the corpus. In some embodiments, the measured variety of each new document can be compared to an average of the variety of the entire corpus.

In some embodiments, the document generator 106 generates the new document 110 by a method privy to that genre of document. For example, a text document can be generated by random insertion of grammatically consistent phrases and synonym replacement; a musical score can be generated by random note change or assignment subject to constraints of rhythm, chord, and dissonance; a graphical image can be generated from an existing one by perturbations in color, tone, or convolution with another image. In some embodiments, the document generator 106 is a cognitive system specialized in document generation, for example, IBM Watson™.

In some embodiments, the outputs produced by the document generator 106 are shown to a user. In some embodiments, the user either accepts as-is, or modifies at least one of the new documents 110 generated. In some embodiments, the user can provide feedback to the system 114. In some embodiments, the feedback involves the user updating the corpus document 102 by adding or removing documents from the corpus. In some embodiments, the user can select which corpus documents are the most important or have the greatest weight. In some embodiments, the feedback involves the user updating the selected variety types 104. In some embodiments, the cycle of new document generation and user feedback can be continuous, such that the user can modify the system until the desired outcomes, e.g. a musical score with a new, interesting melody to the user, is reached. In some embodiments, the user feedback is provided by a graphical user interface.

Figure 2:
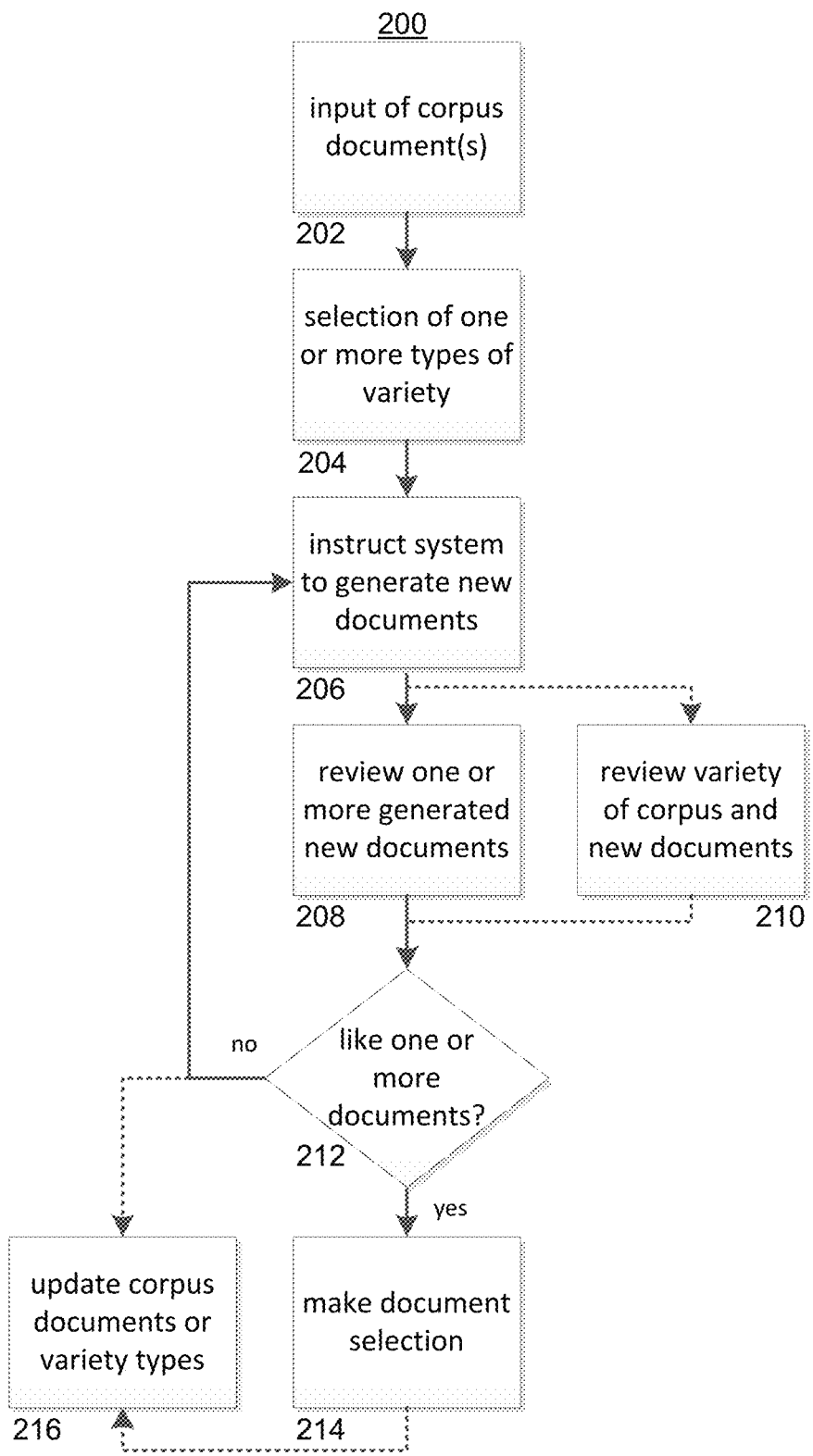
FIG. 2 depicts a flow chart of an exemplary method of using the document generating system.

FIG. 2 depicts a flow chart of a method of using the system described herein 200. First, the user inputs one or more documents as the corpus of documents for the system 202. Next, the user inputs or selects one or more types of variety for the system 204. In some embodiments, the variety can be selected from any of the types of variety disclosed herein. In some embodiments, the variety can be selected by a user. In some embodiments, the variety can be a category or other dimension that is relevant to the corpus documents. In some embodiments, the user can review their selection via a user interface. In some embodiments, the user interface is a graphical user interface.

Once the corpus of documents 202 and the types of variety for the system 204 are set, the user instructs the system to generate one or more new documents 206. In some embodiments, the user instructs the system to generate the one or more new documents, and optionally, additional outputs such as new and corpus document variety, by pressing a button on a graphical user interface, for example. Once generated, the user reviews the new documents 208 to determine which, if any, the user likes. In some embodiments, the user can also review the depicted variety of the corpus and the new documents 210, if such outputs were created by the system.

If the user likes one or more documents 212, the user can select the appropriated documents 214 for either direct use or further editing. The user also has the option of updating either the documents in the corpus, the variety types, or both 216. If the user does not like at least one of the generated documents in step 212, the user can return to step 206 and instruct the system to generate additional new documents. The user also the has option of updating either the documents in corpus, the variety types, or both 216 before the user instructs the system to generate new documents 206. For example, the user does not select any of the new documents for use because all of the documents are too similar to the corpus documents. In this case, the user adds several new documents to the corpus and also changes the variety selections to allow the system to generate new documents with a greater variety. The user then instructs the system to generate new documents and chooses one of the new selections. In some embodiments, if the user has already generated at least one new document, updates to either the corpus of documents or variety types can alter the already generated document or documents in real-time, i.e., as the user is making the updates or just after the user has made the updates.

Figure 3:
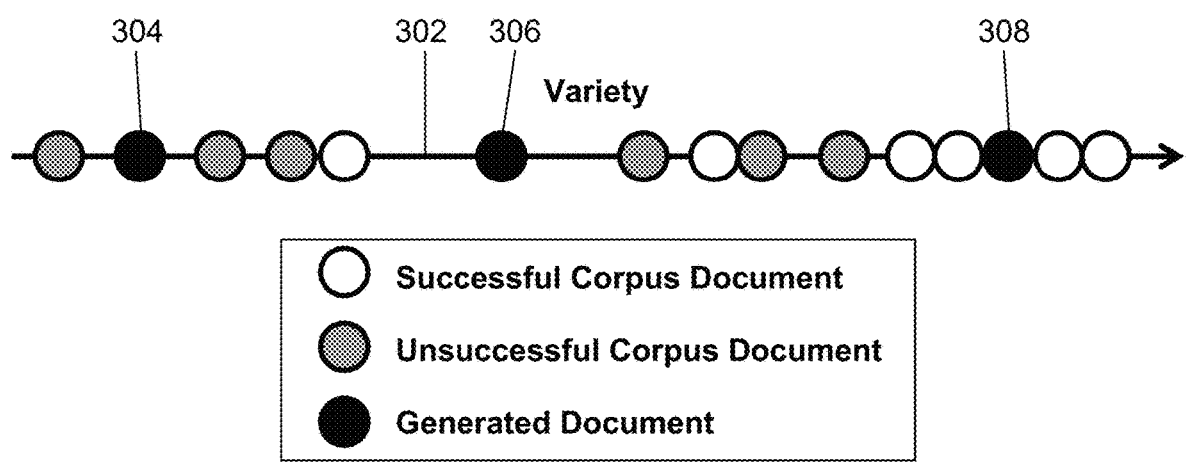
FIG. 3 depicts an example graphical output of measured document variety for a user.

In some embodiments, the system can show the user a graphic depiction of the variety of the documents in the corpus and any new documents generated. FIG. 3 is an example of such a depiction, with a line 302 representing increasing document variety from left to right. The system can plot corpus documents on the line in relation to each other, after the system measures their variety (white and grey dots, see FIG. 1, box 108). New documents generated by the system can also be plotted on this line (black dots, see FIG. 1, box 112). In this manner the user can see how much variety the new documents contain compared to the corpus documents. In FIG. 3, corpus documents are labeled as either successful (white dots) or unsuccessful (grey dots) by some measure that is useful to the user. For example, successful documents may be better liked by the user, or may reach a certain threshold, such as length, that is important to the user. In this example, there are three generated documents, one in the low variety region 304, one in a middle variety region 306, and one in a high variety region 308. The new document 308 is both high in variety and is also surrounded by corpus documents that were deemed successful by the user, so this may be a good selection by the user, or at least a good first place to start the user's document review as compared to the low variety region document 304, which is surrounded by unsuccessful corpus documents.

FIG. 3 compares corpus and newly generated documents on a simple, 1-dimensional variety axis, where the positional difference between two documents is the scalar difference of their varieties. One skilled in the art will appreciate that there are many ways of measuring variety in a corpus of documents. For example, variety can be calculated as a differential variety, the difference between the variety of a "super document" consisting of all of the corpus documents together and the average variety of the corpus documents. In some embodiments, the differential variety can be a nearest-neighbor differential variety, wherein newly generated documents can be compared to corpus documents with similar variety, by taking the difference between the variety of a "super document" consisting of the new generated document and all corpus documents with a similar variety and the average variety of those same documents. With this type of variety calculation, large positive values for variety indicates an increased variety compared to the corpus documents, and negative values indicate a decreased variety.

Figure 4A:
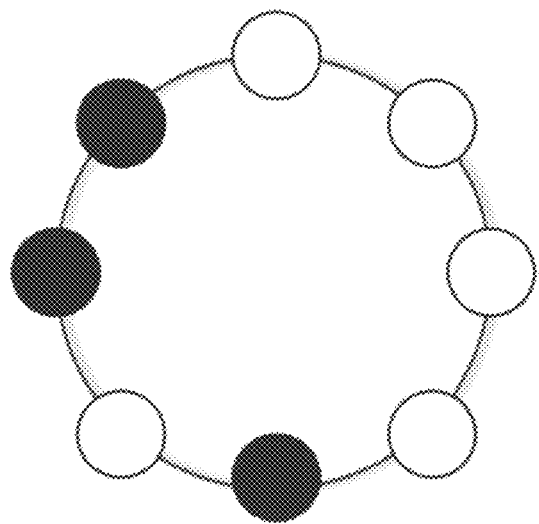
FIGS. 4A and 4B depict example rings with different amount of variety.
Figure 4B:
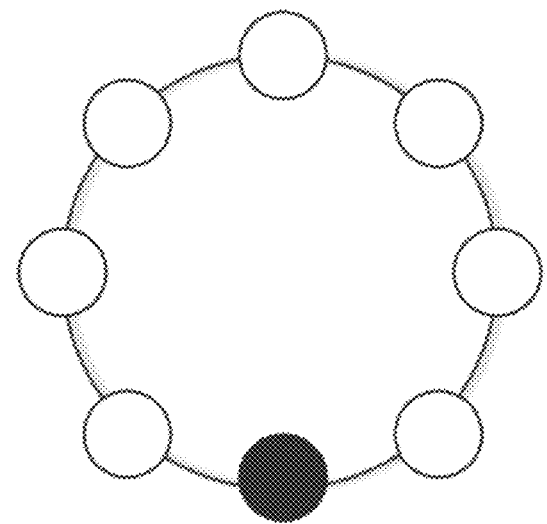

In some embodiments, variety can be expressed as the inverse of indifference:

$$\text{Variety} = \frac{1}{\text{Indifference}}$$

where indifference is the radius of the smallest subgraph centered on that vertex which allows it to be distinguished from all other vertices. The total indifference of such a system is then the sum of the vertices' indifferences and variety is the inverse. For example, consider the two black-and-white beaded circles in FIGS. 4A and 4B. FIG. 4A has three black beads, while FIG. 4B only has one black bead. Intuitively, FIG. 4A has more variety, and this can be shown mathematically. FIG. 4A has six of its beads uniquely defined by the bead itself and its immediate neighbors on the left and right. For example, the far left bead in FIG. 4A can be identified as "black-black-white" in the pattern of "left neighbor-bead-right neighbor." This is defined as a radius of 1. The remaining two beads can be uniquely defined by including one bead further in both direction, or "next left neighbor-left neighbor-bead-right neighbor-next right neighbor." This is defined as a radius of 2. The total indifference of FIG. 4A is 6*1+2*2=10, and the variety is the inverse, or 1/10. FIG. 4B has only one black bead, and thus every bead must define itself with respect to that location, which is up to 4 neighbors away. The total indifference of FIG. 4B is 1*0+2*1+2*2+2*3+1*4=16, and the variety is the inverse, or 1/16. Since 1/10 is greater than 1/16, FIG. 4A has a greater variety than FIG. 4B.

In some embodiments, variety can be expressed as the weighted sum of spectral moments. In some embodiments, this measurement of variety quantitatively adjusts for amplitudes and generalizes calculations for continuous systems. Given an amplitude A(t) that changes in one dimension t, take the Fourier Transform of A(t):

$$F(x) = \int A(t-x)e^{-2\pi i x t} dt$$

The spectral moments M(n) would then be defined as:

$$M(n) = \frac{1}{(2n)!} \int_0^\infty x^n F(x)dx$$

For discrete or non-continuous systems, e.g. musical scores, the transform becomes:

$$F(m) = \sum_{n=0}^{N-1} A(n)e^{2\pi i mn/N}$$

The spectral moments M(n) would then be defined as:

$$M(n) = \frac{2}{N} \sum_{m=0}^{N/2-1} \left(\frac{m}{N}\right)^n F(m)$$

In both the continuous or discrete case, variety is defined as a weighted sum of the spectral moments M(n):

$$\text{Variety} = \sum_{n=1}^\infty \frac{M(n)}{n^2}$$

For an example in music, A(t) can be the variation of tone or frequency with time, while its Fourier Transform gives essentially the musical score. Moments of this indicate symmetries in the placement of notes through the score, from which the rhythms and melodies can be inferred. For an example in literature, A(t) can be the relative word frequency as a function of position in the text, and the Fourier Transform will show how patterns in vocabulary appear. For an example in automobile design, several A(t) functions could represent the geometric contours of a car body along various axes, and the Fourier Transform will show the design patterns and visual variation.

One skilled in the art will note that a perfectly flat amplitude of zero (A=0) and a completely random A(t) will both have zero variety. One skilled in the art will also note that the weighted sum above and all measurements of variety discussed herein are just some of many ways to combine spectral moments. In some embodiments, any method of combining spectral moments can be used as a measure of document variety.

In some embodiments, the user of any of the systems disclosed herein, can be one or more human users, as known as "human-in-the-loop" systems. In some embodiments, the user of any of the systems disclosed herein can be a computer system, artificial intelligence ("AI"), cognitive or non-cognitive algorithms, and the like. The following table is a non-exclusive and non-exhaustive list of examples using any of the system disclosed herein.

| User | Example description |
| --- | --- |
| human | You are writing an email to a prospective business client in the oil industry. Having a collection of several representative example emails to this or similar clients as a document corpus, and based on the style examples, several alternative emails are generated from which you can choose to accept or edit. |
| human | A musician wishes to generate interesting variations on an existing piece of music. Defining a corpus of just that piece, the generator returns a ranked list of variants. |
| human | A chef would like to try new variations on existing recipes. Feeding these into the generator, he investigates the results and picks what seems promising. |
| human | A scientist designing an experiment with many setup parameters wishes to generate variations which achieve the same end-measurement. He can then run the experiments in parallel to achieve a certain robustness to systematic uncertainties. |
| human | A committee is brainstorming an issue; putting all ideas into a database, the generator produces a set of sufficiently different ideas (using differential variety as a measure of this) that the group can utilize. |
| human | A writer wants to generate a rich plot-line completely different from those of existing top-sellers. The Generator can return new ones with different variety. |
| human | As a tool for business strategy, corporate leadership can input a corpus of strategies (both failures and successes) used in the past and generate new ones with similar variety to the successful ones. |
| human | During a political negotiation, one side can input past negotiation deals (the dimensions here being how much of a given item or privilege was yielded) into the corpus, computing new propositions within the neighborhood of successful deals. |
| human | An urban planning architect is designing a residential area which should have some small amount of variation in a given style. Giving existing blueprints to the system, a list of slight variations are returned by the system which can then undergo further review. |
| human | A classroom teacher would like to present course material in a completely new way, to experiment with increasing student engagement. Defining a corpus of past lectures, the generator returns suggested variants. |
| human | In multi-player video gaming, given a population of game strategies, the generator returns a list of new strategies from which the user can select. This can be extended to any gaming situation, including politics and diplomacy. |
| AI | A virtual reality program wishes to generate a realistic forest setting. Rather than randomly placing trees and vegetation, which would look odd, it generates a variation from existing forests in its database. |
| AI | A dialog system would like to generate interesting questions and responses to users. The system provides a corpus of past questions and answers to the generator, and then randomly chooses from the list of suggested variations |
| AI | In an adversarial (game) situation, the AI would like to generate a variation on proven effective strategies to surprise the opponent. |
| AI | A future Mars exploration rover, tasked with finding a suitable area for colonization, needs to measure as many different surface environments of a certain minimum area as it can. Given that the accessible surface can be divided into such areas with known values of relevant parameters (elevation, moisture level, mineral content, etc.), this defines a corpus. The generator can return a ranked list of each area's variation, and the rover can pick a number of candidate areas with different levels of variety. |
| AI | A robotic manufacturing line needs to continuously produce slight variations of patterns printed on the product. With each produced batch, the corpus of variations grows and it can generate new patterns based on that. |

In some embodiments, any of the systems disclosed herein may output a sorted list of the existing corpus documents, ranked according to features and variety, instead of generating new documents. For example, a user could use the system to provide a measurement of the variety within a corpus to determine if additional documents should be added to the corpus to reach a desired amount of variety. In some embodiments, any of the systems disclosed herein may determine the differences between a single user supplied document and a corpus of documents, according to features and variety.

Figure 5:
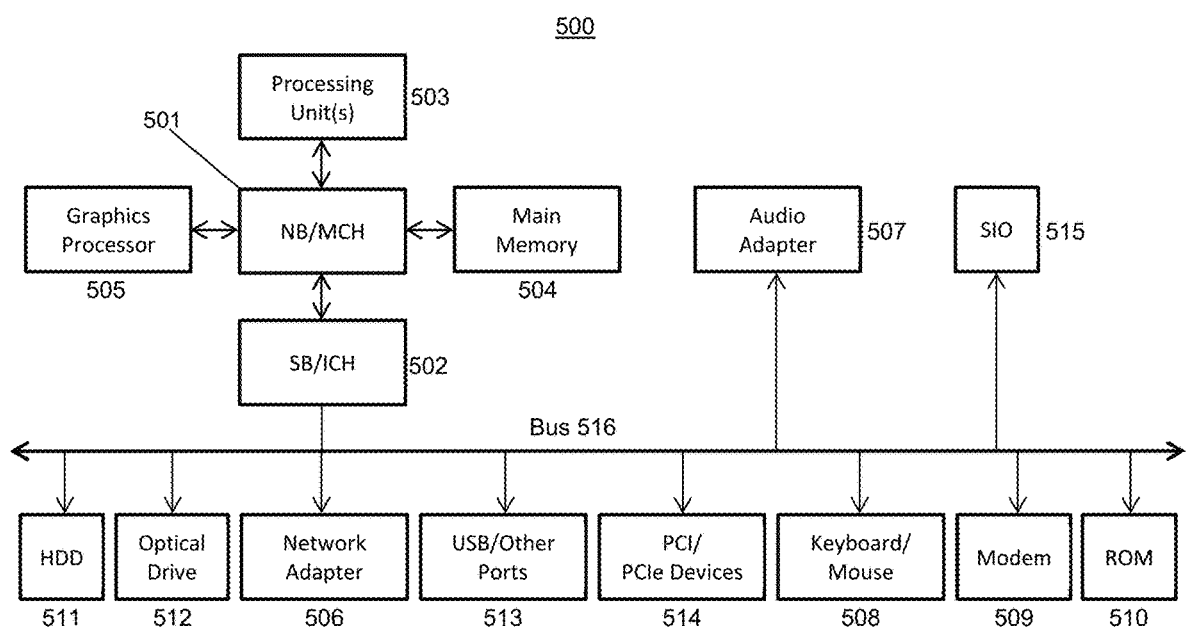
FIG. 5 depicts a block diagram of an example data processing system in which aspect of the illustrative embodiments may be implemented.

FIG. 5 depicts a block diagram of an example data processing system 500 in which aspects of the illustrative embodiments are implemented. Data processing system 500 is an example of a computer, such as a sever or client, in which computer usable code or instructions implementing the process for illustrative embodiments of any of the disclosures described herein are located. In one embodiments, FIG. 5 represents a server computing device, such as a server, which implements the card-based programming system described herein.

In the depicted example, data processing system 500 can employ a hub architecture including a north bridge and memory controller hub (NB/MCH) 501 and south bridge and input/output (I/O) controller hub (SB/ICH) 502. Processing unit 503, main memory 504, and graphics processor 505 can be connected to the NB/MCH 501. Graphics processor 505 can be connected to the NB/MCH through an accelerated graphics port (AGP).

In the depicted example, the network adapter 506 connects to the SB/ICH 502. The audio adapter 507, keyboard and mouse adapter 508, modem 509, read only memory (ROM) 510, hard disk drive (HDD) 511, optical drive (CD or DVD) 512, universal serial bus (USB) ports and other communication ports 513, and the PCI/PCIe devices 514 can connect to the SB/ICH 502 through bus system 516. PCI/PCIe devices 514 may include Ethernet adapters, add-in cards, and PC cards for notebook computers. ROM 510 may be, for example, a flash basic input/output system (BIOS). The HDD 511 and optical drive 512 can use an integrated drive electronics (IDE) or serial advanced technology attachment (SATA) interface. The super I/O (SIO) device 515 can be connected to the SB/ICH.

An operating system can run on processing unit 503. The operating system can coordinate and provide control of various components within the data processing system 500. As a client, the operating system can be a commercially available operating system. An object-oriented programming system, such as the Java™ programming system, may run in conjunction with the operating system and provide calls to the operating system from the object-oriented programs or applications executing on the data processing system 500. As a server, the data processing system 500 can be an IBM® eServer™ System P® running the Advanced Interactive Executive operating system or the Linux operating system. The data processing system 500 can be a symmetric multiprocessor (SMP) system that can include a plurality of processors in the processing unit 503. Alternatively, a single processor system may be employed.

Instructions for the operating system, the object-oriented programming system, and applications or programs are located on storage devices, such as the HDD 511, and are loaded into the main memory 504 for execution by the processing unit 503. The processes for embodiments of the medical record error detection system can be performed by the processing unit 503 using computer usable program code, which can be located in a memory such as, for example, main memory 504, ROM 510, or in one or more peripheral devices.

A bus system 516 can be comprised of one or more busses. The bus system 516 can be implemented using any type of communication fabric or architecture that can provide for a transfer of data between different components or devices attached to the fabric or architecture. A communication unit such as the modem 509 or network adapter 506 can include one or more devices that can be used to transmit and receive data.

Those of ordinary skill in the art will appreciate that the hardware required to run any of the systems and methods described herein may vary depending on the implementation. Other internal hardware or peripheral devices, such as flash memory, equivalent non-volatile memory, or optical disk drives may be used in addition to or in place of the hardware depicted. Moreover, any of the systems described herein can take the form of any of a number of different data processing systems, including but not limited to, client computing devices, server computing devices, tablet computers, laptop computers, telephone or other communication devices, personal digital assistants, and the like. Essentially, any of the systems described herein can be any known or later developed data processing system without architectural limitation.

The systems and methods of the figures are not exclusive. Other systems, and processes may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions which are executed by the processor to cause the processor to implement a document generation system, and a user interface, the method comprising:
   receiving, by the document generation system, one or more documents selected by a user that defines a corpus;
   receiving, by the document generation system, one or more types of variety selected by the user, wherein at least one type of selected variety comprises an inverse of indifference, where indifference is the radius of the smallest subgraph centered on that vertex which allows it to be distinguished from all other vertices;
   determining, by the document generation system, the variety of each document in the corpus by applying the one or more types of variety to the one or more documents in the corpus;
   generating, by the document generation system, one or more new documents, wherein the one or more new documents are variants in the same genre of the one or more documents in the corpus;
   determining, by the document generation system, the variety of each new document by applying the one or more types of variety to the one or more new documents;

generating, by the document generation system, at least one variety graphic depicting the variety of the one or more new documents in comparison to each of the documents in the corpus; and transmitting, by the user interface, the one or more new documents and the at least one variety graphic to the user.

2. The method of claim 1, wherein the at least one type of variety further comprises a differential variety.

3. The method of claim 2, wherein the at least one type of variety further comprises a nearest-neighbor differential variety.

4. The method of claim 1, wherein the at least one type of variety further comprises a weighted sum of the spectral moments.

5. The method of claim 1, wherein the user can provide user feedback to update the corpus of documents, the one or more types of variety, or both, via the user interface.

6. The method of claim 5, wherein user updates can be applied to new documents in real-time.

7. A system for generating new documents, comprising:
A user interface and a memory comprising instructions which are executed by a processor configured to:
receive one or more documents selected by a user that defines a corpus;
receive one or more types of variety selected by the user, wherein at least one type of selected variety comprises an inverse of indifference, where indifference is the radius of the smallest subgraph centered on that vertex which allows it to be distinguished from all other vertices;
determine the variety of each document in the corpus by applying the one or more types of variety to the one or more documents in the corpus;
generate one or more new documents, wherein the one or more new documents are variants in the same genre of the one or more documents in the corpus;
determine the variety of each new document by applying the one or more types of variety to the one or more new documents;
generate at least one variety graphic depicting the variety of the one of more new documents in comparison to each of the documents in the corpus; and
transmit, via the user interface, the one or more new documents and the at least one variety graphic to the user.

8. The system of claim 7, wherein the at least one type of variety further comprises a differential variety.

9. The system of claim 8, wherein the at least one type of variety further comprises a nearest-neighbor differential variety.

10. The system of claim 7, wherein the at least one type of variety further comprises a weighted sum of the spectral moments.

11. The system of claim 7, wherein the document generation system comprises a user interface.

12. The system of claim 11, wherein the step of transmitting the one or more new documents and the variety of each document to the user is via the user interface.

13. The system of claim 7, wherein the user can provide user feedback to update the corpus of documents, the one or more types of variety, or both, via the user interface.

14. The system of claim 13, wherein user updates can be applied to new documents in real-time.

15. A computer program product for the generation of new documents, the computer program product comprising a user interface and a computer readable storage medium having program instructions embodied therewith, the program instructions executable by a processor to cause the processor to:
receive one or more documents selected by a user that defines a corpus;
receive one or more types of variety selected by the user, wherein at least one type of selected variety comprises an inverse of indifference, where indifference is the radius of the smallest subgraph centered on that vertex which allows it to be distinguished from all other vertices;
determine the variety of each document in the corpus by applying the one or more types of variety to the one or more documents in the corpus;
generate one or more new documents, wherein the one or more new documents are variants in the same genre of the one or more documents in the corpus;
determine the variety of each new document by applying the one or more types of variety to the one or more new documents;
generate at least one variety graphic depicting the variety of the one of more new documents in comparison to each of the document in the corpus; and
transmit, via the user interface, the one or more new documents and the at least one variety graphic to the user.

16. The computer program product of claim 15, wherein the user can provide real-time user feedback to update the corpus of documents, the one or more types of variety, or both, via the user interface.

* * * * *